United States Patent
Wang

(10) Patent No.: US 8,899,904 B2
(45) Date of Patent: Dec. 2, 2014

(54) LENS PUSH-OUT DEVICE AND METHOD

(75) Inventor: Chien-Chun Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/473,623

(22) Filed: May 17, 2012

(65) Prior Publication Data

US 2013/0164104 A1    Jun. 27, 2013

(30) Foreign Application Priority Data

Dec. 27, 2011   (TW) .............................. 100148786 A

(51) Int. Cl.
*B65B 69/00* (2006.01)
(52) U.S. Cl.
USPC ........................................ 414/405; 414/404
(58) Field of Classification Search
CPC .. B65B 69/00; B65G 65/00; H01L 21/67132; H01L 21/67781; H01L 21/6835; H01L 21/67326
USPC .......................... 414/404, 405, 416.12, 416.09
See application file for complete search history.

(56) References Cited

U.S. PATENT DOCUMENTS

| | | | | | |
|---|---|---|---|---|---|
| 3,518,752 | A | * | 7/1970 | Lentz | 29/592.1 |
| 3,780,892 | A | * | 12/1973 | Frank | 414/811 |
| 5,706,634 | A | * | 1/1998 | Edwards et al. | 53/473 |
| 6,543,984 | B1 | * | 4/2003 | Hovey et al. | 414/405 |
| 2004/0231438 | A1 | * | 11/2004 | Schwartz | 73/864.17 |
| 2013/0164104 | A1 | * | 6/2013 | Wang | 414/304 |

* cited by examiner

*Primary Examiner* — Saul Rodriguez
*Assistant Examiner* — Emery Hassan
(74) *Attorney, Agent, or Firm* — Novak Druce Connolly Bove + Quigg LLP

(57) ABSTRACT

Provided is a device for pushing out lenses from a test tray to a lens tray. The device includes a pushing tray, two force application trays, and at least two bolts. The pushing tray includes a surface and four sidewalls. A number of projections extend upward from the first surface. The projections are configured for pushing the lenses. Two opposite sidewalls each define at least one threaded hole. Each of the force application trays defines at least one slot. A length of the at least one slot runs in direction parallel to the projections. The two force application trays are configured for clamping the test tray. Each bolt passes through a respective slot and is screwed into a respective threaded hole of the pushing tray.

8 Claims, 5 Drawing Sheets

LENS PUSH-OUT DEVICE AND METHOD

BACKGROUND

1. Technical Field

The present disclosure relates to push-out devices and, particularly, to a lens push-out device and a lens push-out method.

2. Description of Related Art

A lens module may include a lens barrel and a number of lenses adhesively received in the lens barrel. The lens module is positioned on a test tray, and needs a modulation transfer function (MTF) test, before shipment. After the MTF test is completed, the lens module positioned on the test tray needs be flipped to a lens tray in order to complete the assembly process. Adhesive residue from the lens barrel may easily flow onto the test tray, thereby causing the lens module to stick on the test tray. The process of pushing-out the lens module to flip to the lens tray may be carried out manually. For example, beating the test tray to ensure that every lens module is transferred from the test tray onto the lens tray. This carries the risk of a surface of the lens module being scratched and abraded when the test tray and the lens tray rub against each other. In addition, it is time-consuming and inefficient.

Therefore, it is desirable to provide a lens push-out device and a lens push-out method, which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
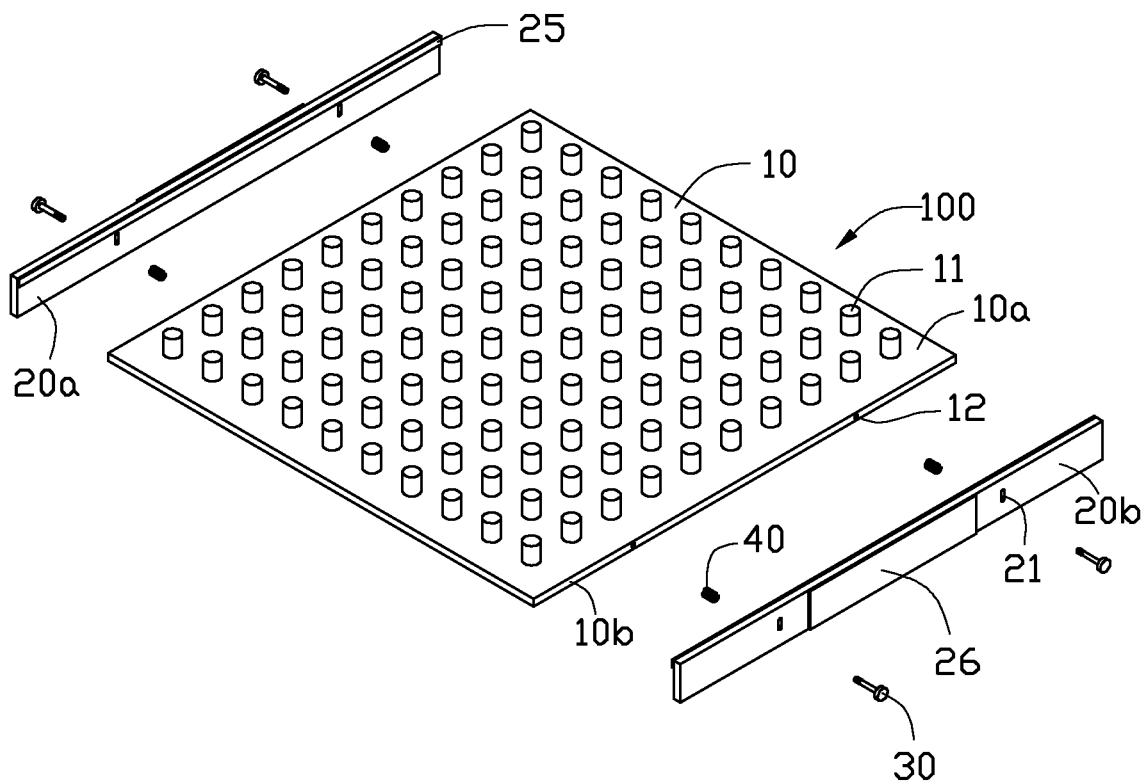
FIG. 1 is an exploded, isometric view of a lens push-out device, according to an exemplary embodiment.
Figure 2:
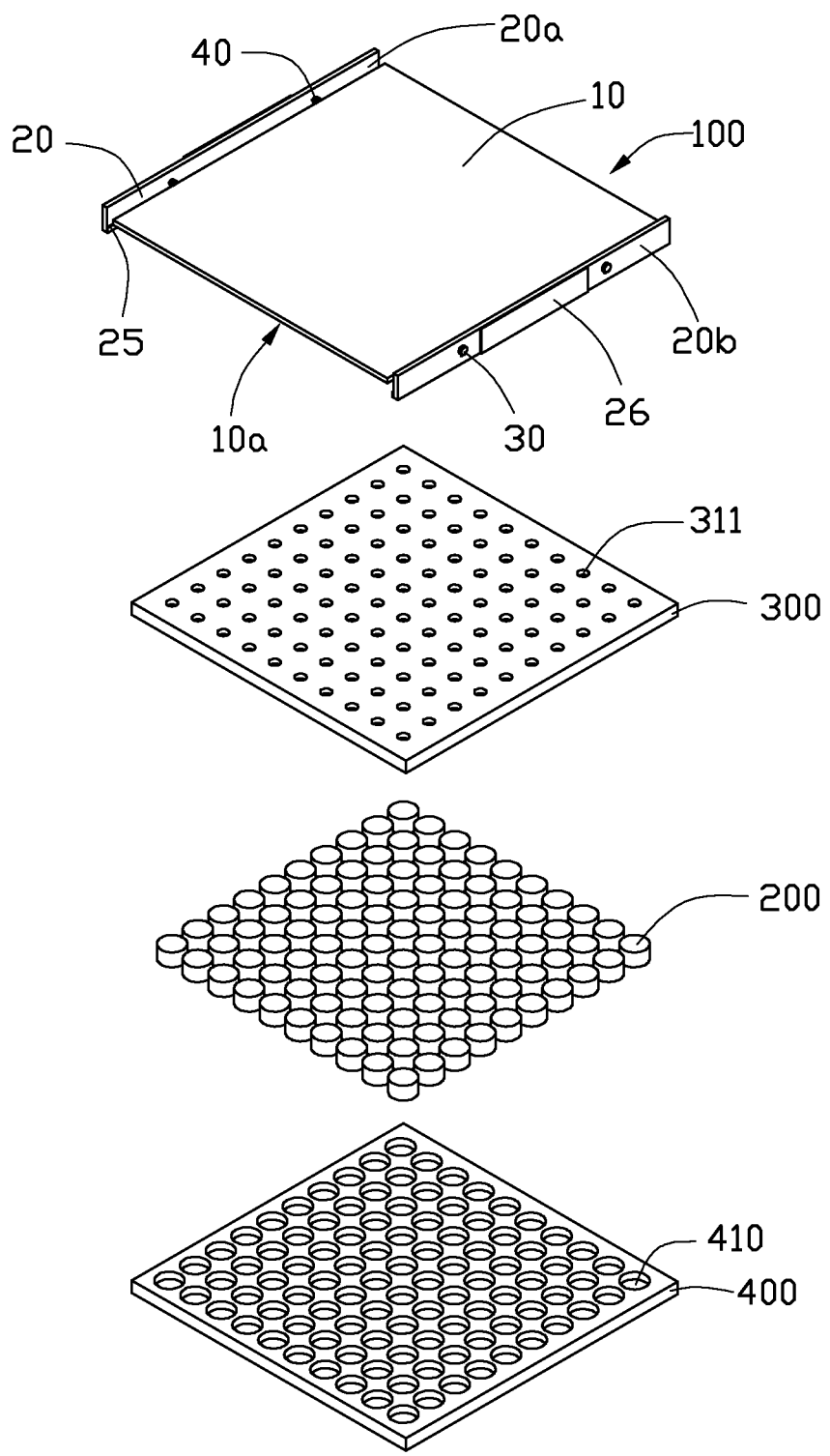
FIG. 2 is an assembled, isometric view of the lens push-out device of FIG. 1 in use.
Figure 3:
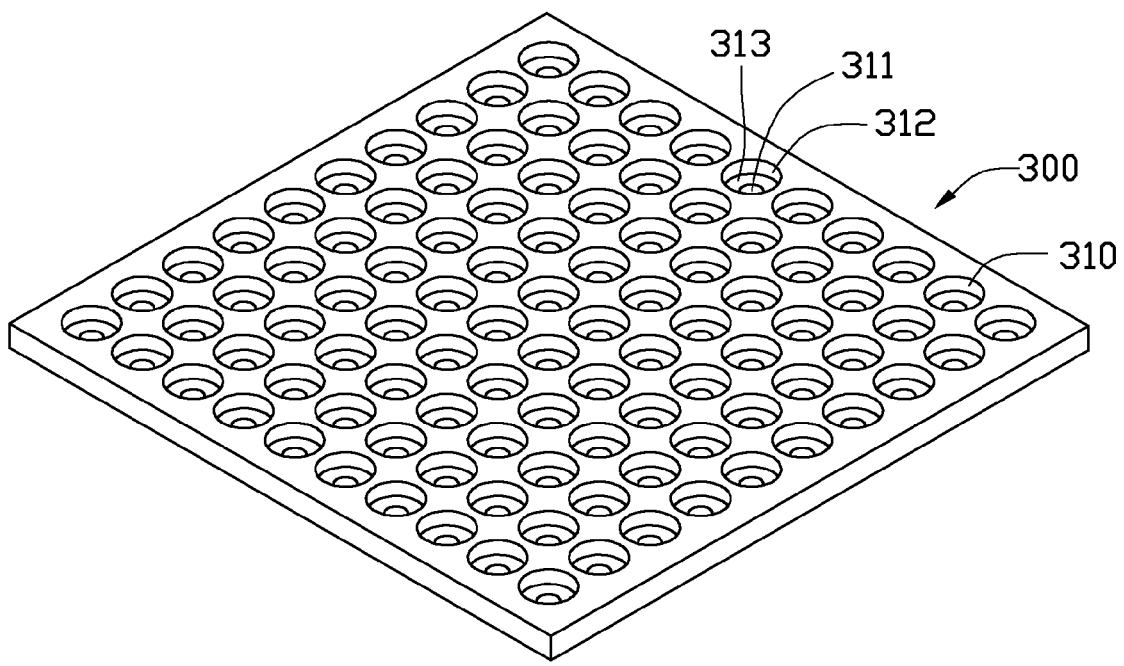
FIG. 3 is an assembled view of a test tray of the lens push-out device of FIG. 1.
Figure 4:
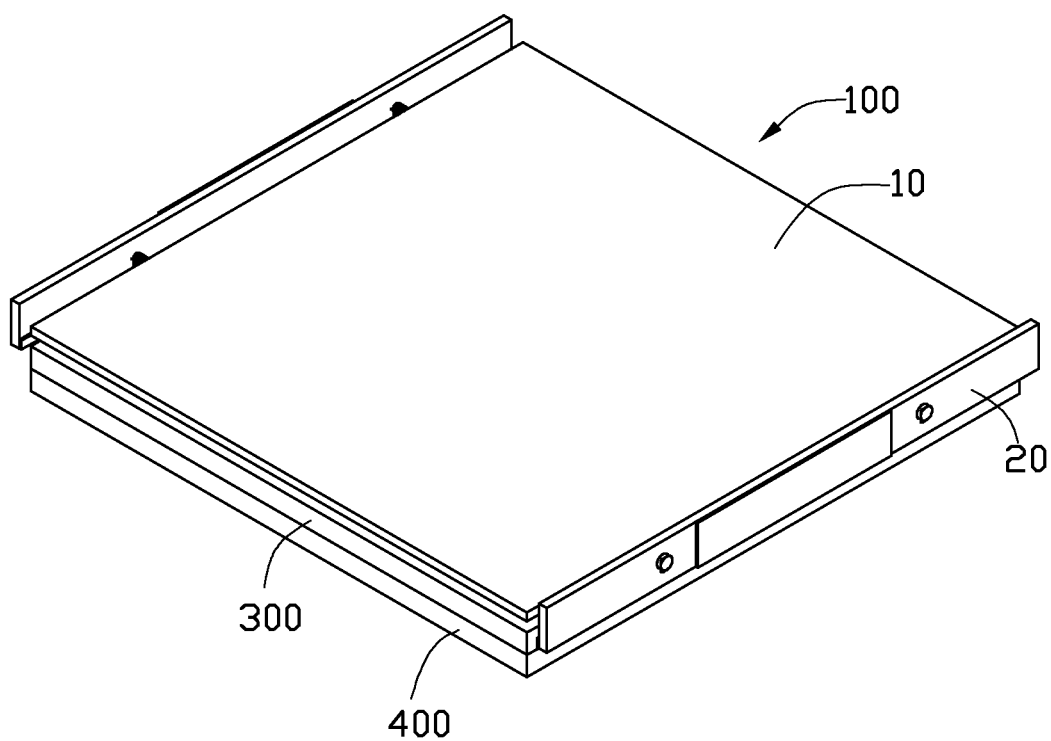
FIG. 4 is similar to FIG. 2, which is in another state of use.

Referring to FIGS. 1-4, a lens push-out device 100 is shown according to an exemplary embodiment, for pushing out a number of lenses 200 from a test tray 300 to a lens tray 400.

The test tray 300 defines a number of circular stepped holes 310. In the present embodiment, the stepped holes 310 are arranged in a 10×10 array. Each of the stepped holes 310 includes a first cavity 311 and a second cavity 312 communicating with the first cavity 311. Both the first cavity 311 and the second cavity 312 are concentric with each other. The diameter of the first cavity 311 is less than that of the second cavity 312, so that a step 313 is defined between the first cavity 311 and the second cavity 312. The axial length of the second cavity 312 is not less than that of the lenses 200. The lenses 200 are received in the second cavities 312 of the test tray 300, and each of the steps 313 supports a respective one of the lenses 200.

The lens tray 400 defines a number of receiving holes 410. In the present embodiment, the receiving holes 410 are arranged in the same 10×10 array for holding the lenses 200. The axial length of the receiving holes 410 is not less than that of the lenses 200.

The lens push-out device 100 includes a pushing tray 10, two force application trays 20, four bolts 30, and four elastic elements 40.

The pushing tray 10 is square, and includes a first surface 10a. A number of equidistant projections 11 are integrally formed with and are substantially perpendicularly extended upward from the first surface 10a. In the present embodiment, the projections 11 are also arranged in a 10×10 array. Each of the projections 11 is cylindrical. All of the projections 11 are in the same height. The diameter of the projection 11 is less than that of the first cavity 311. The projections 11 are configured for passing through the first cavity 311 to push the lenses 200 out of the second cavity 312. In particular, the projections 11 are made of non-abrasive plastic. Alternatively, the projections 11 and the pushing tray 10 may be separately formed, for example, the projections 11 can be adhesively attached to the first surface 10a, or welded, or by other attaching methods.

The pushing tray 10 also includes four sidewalls 10b connected with each other, and perpendicularly extending downward from the edges of the first surface 10a. In the present embodiment, two opposite sidewalls 10b each define two threaded holes 12. The two threaded holes 12 defined on the same sidewall 10b are spaced apart by a distance.

Each of the force application trays 20 includes a second surface 20a and a third surface 20b facing away the second surface 20a. Each of the force application trays 20 defines two slots 21 passing through the second surface 20a and the third surface 20b. Each slot 21 has a substantially rectangular-shaped cross-section. A length of each of the slots 21 runs in a direction parallel to the projections 11.

The lens push-out device 100 also includes two rubber strips 25 and two anti-slip strips 26. Each of the rubber strips 25 is positioned on an end of the second surface 20a of the force application trays 20. Each of the anti-slip strips 26 is positioned on the third surface 20b, between the two slots 21 defined on the same force application tray 20.

Each of the elastic elements 40 sleeves around a bolt 30. In assembly, the bolts 30 passes through the slots 21 and screw into the threaded holes 12 of the pushing tray 10. In this way, the elastic elements 40 are sandwiched between the pushing tray 10 and the force application trays 20. In particular, the elastic elements 40 are coil springs. In the present embodiment, the maximum distance between the rubber strip 25 and the projections 11 in a direction perpendicular to the pushing tray 10 is substantially equal to the thickness of the test tray 300. As such, the test tray 300 can be clamped between the rubber strips 25 and the pushing trap 10 by the rubber strips 25.

The number of the threaded holes 12, the slots 21, and the bolts 30 is not limited to four, in other embodiments, the number of each of these components may be two, or three or more than four.

The inclusion of the elastic elements 40 is not essential in another embodiment.

Figure 5:
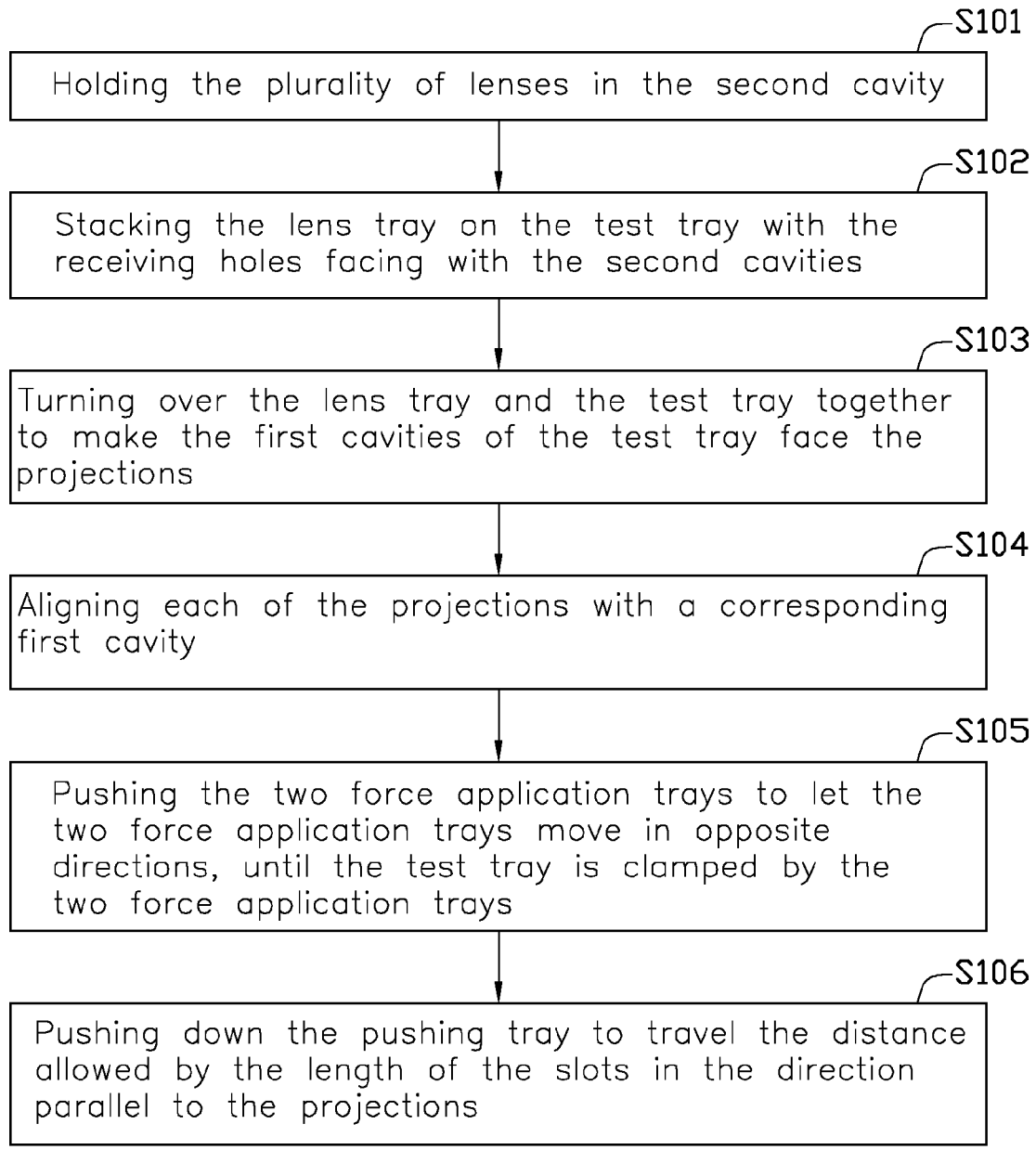
FIG. 5 is a flowchart of a lens pushing method, according to an exemplary embodiment.

Referring to FIG. 5, a flowchart of a method for pushing-out a number of lenses 200 from the stepped holes 310 of the test tray 300 to the receiving holes 410 of lens tray 400 is shown. The method includes the following steps: in step S101: holding the number of lenses 200 in the second cavity 312; S102: stacking the lens tray 400 on the test tray 300 with the receiving holes 410 facing with the second cavities 312 of the stepped holes 310; S103: turning over the lens tray 400 and the test tray 300 together to make the first cavities 311 of the test tray 300 face the lens push-out device 100; S104: aligning every projection 11 of the pushing tray 10 with a corresponding first cavity 311; S105: pushing the two force application trays 20 to let the two force application trays 20 move in opposite directions, until the test tray 300 is held between the pushing tray 10 and the rubber strips 25; S106: pushing down the pushing tray 10 to travel the distance allowed by the length of the slots 21 in the direction parallel to the projections 11. The lenses 200 held in the test tray 300 are thus pushed out from the test tray 300 into the receiving holes 410 of the lens tray 400.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens push-out device configured for pushing out a plurality of lenses held in a plurality of stepped holes of a test tray to a lens tray, the lens push-out device comprising:
    a pushing tray comprising a first surface and four sidewalls connected with each other, the four sidewalls be substantially perpendicularly extending downwards from edges of the first surface, the pushing tray comprising a plurality of projections extending upwards from the first surface, the projections configured for passing through the stepped holes to push the lenses out of the stepped holes, two opposite sidewalls each defining at least one threaded hole;
    two force application trays, each of the force application trays defining at least one slot, a length of each slot running in a direction parallel to the projections, the two force application trays configured for clamping the test tray;
    at least two bolts, each bolt passing through a respective slot and screwing into a respective threaded hole of the pushing tray; and
    at least two elastic members, wherein each elastic member is sleeved around a respective bolt and is sandwiched between the pushing tray and a respective one of the force application trays, each elastic elements is a coil spring.

2. The lens push-out device of claim 1, wherein the plurality of projections are integrally formed with the pushing tray, and are equidistantly arranged on the first surface.

3. The lens push-out device of claim 1, wherein the projections are adhesively attached to the first surface.

4. The lens push-out device of claim 1, wherein the projections are arranged in a 10×10 array.

5. The lens push-out device of claim 1, wherein the projections are made of non-abrasive plastic and are in the same height.

6. The lens push-out device of claim 1, further comprising two rubber strips, wherein each of the rubber strips is positioned on a surface of a respective one of the force application trays, a maximum distance between the rubber strips and the projections along a direction parallel to the projections is substantially equal to a thickness of the test tray.

7. The lens push-out device of claim 1, further comprising two anti-slip strips, wherein each of the anti-slip strips is positioned on a surface of a respective one of the force application trays facing away the pushing tray.

8. A lens push-out method configured for pushing out a plurality of lenses held in a plurality of circular stepped holes of a test tray to a lens tray, each of the stepped holes comprising a first cavity and a second cavity communicating with the first cavity, a diameter of the first cavity being less than that of the second cavity, the lens tray defining a plurality of receiving holes, the lens push-out method comprising the following steps:
    providing a lens push-out device, wherein the lens push-out device comprising:
        a pushing tray comprising a first surface and four sidewalls connected with each other, the four sidewalls be substantially perpendicularly extending downwards from edges of the first surface, the pushing tray comprising a plurality of projections extending upwards from the first surface, two opposite sidewalls each defining at least one threaded hole;
        two force application trays, each of the force application trays defining at least one slot, a length of each slot running in a direction parallel to the projections; and
        at least two bolts, each bolt passing through a respective slot and screwing into a respective threaded hole of the pushing tray;
    holding the plurality of lenses in the second cavity;
    stacking the lens tray on the test tray with the receiving holes facing with the second cavities;
    turning over the lens tray and the test tray together to make the first cavities of the test tray face the projections;
    aligning each of the projections with a corresponding first cavity;
    pushing the two force application trays to let the two force application trays move in opposite directions, until the test tray is clamped by the two force application trays; and
    pushing down the pushing tray to travel the distance allowed by the length of the slots in the direction parallel to the projections.

* * * * *